United States Patent [19]

Graas

[11] Patent Number: 4,479,525

[45] Date of Patent: Oct. 30, 1984

[54] PNEUMATIC TIRE TREAD

[75] Inventor: Maurice Graas, Luxembourg, Luxembourg

[73] Assignee: The Goodyear Tire & Rubber Company, Akron, Ohio

[21] Appl. No.: 531,981

[22] Filed: Sep. 14, 1983

[51] Int. Cl.³ ............................................. B60C 11/00
[52] U.S. Cl. ................................ 152/209 R; D12/139; 152/209 D
[58] Field of Search ........... 152/209 A, 209 R, 209 D; D12/136, 139

[56] References Cited

U.S. PATENT DOCUMENTS

D. 204,535  4/1966  Anslow ............................. D12/136
4,383,568   5/1983  Pieper .............................. 152/209 R
4,424,844   1/1984  Fontaine .......................... 152/209 R

OTHER PUBLICATIONS

Dunlop Limited, Registered Design #999028, May 21, 1981, Great Britain.

Primary Examiner—Michael Ball
Attorney, Agent, or Firm—Frank Pincelli

[57] ABSTRACT

A pneumatic tire having a tread portion comprising a plurality of independent blocks, each of which is directional in that it only has a single plane of symmetry. All of the blocks are arranged to point in the same axial direction across the tire, preferably with a convex face towards the outside edge of the tread portion.

13 Claims, 4 Drawing Figures

FIG. I

PNEUMATIC TIRE TREAD

This invention relates to pneumatic tires and in particular, but not exclusively, to automobile tires for use on wet and icy roads.

It is known that tires operate in conditions in which the inside and outside of a tire are subject to different operating conditions, for example during cornering. The terms inside and outside of a tire refer to the positions as on a vehicle i.e. the outside of the tire is that side of the tire facing towards the outside of the vehicle. Therefore tire tread patterns have been developed which are assymmetrical in order to compensate for these differences. When a vehicle is driven on wet or icy roads there is an increased possibility that the driver may loose control of the vehicle. This is because there is a reduction in the coefficient of friction between the tire and the road surface.

The present invention seeks to provide a tire with an assymmetric tread pattern and with improved lateral stability.

Accordingly to the present invention there is provided a pneumatic tire having a tread portion with a pair of lateral edges, the tread portion comprising a plurality of independent blocks each having a single plane of symmetry which is directed substantially axially across the tread portion, the blocks each having a respective face thereon directed towards a given one of said edges, all of the respective faces having a similar shape.

A plane of symmetry is a plane which divides an object into two halves, one of which is the mirror image of the other.

When an above tire is mounted on a vehicle, said edges are inner and outer edges with respect to the vehicle e.g. the outer edge of the tire is towards the outside of the vehicle, and preferably the blocks are arranged in circumferential rows around the tire and the axial length of the blocks in each row increases progressively from row to row across the tire. In the preferred embodiment the blocks increase in length from the innermost row to be longest at the outermost row.

Furthermore it is preferred that each block is formed so that its respective face thereon has a convex configuration, preferably substantially semi-circular directed towards the outer edge.

It is yet another aspect of the invention that each block is formed with at least one slit extending into the block from its periphery, and that all the slits so formed in the tread portion extend towards a given lateral edge, preferably the outer edge.

The invention will be described by way of example and with reference to the following drawings in which.

Figure 1:
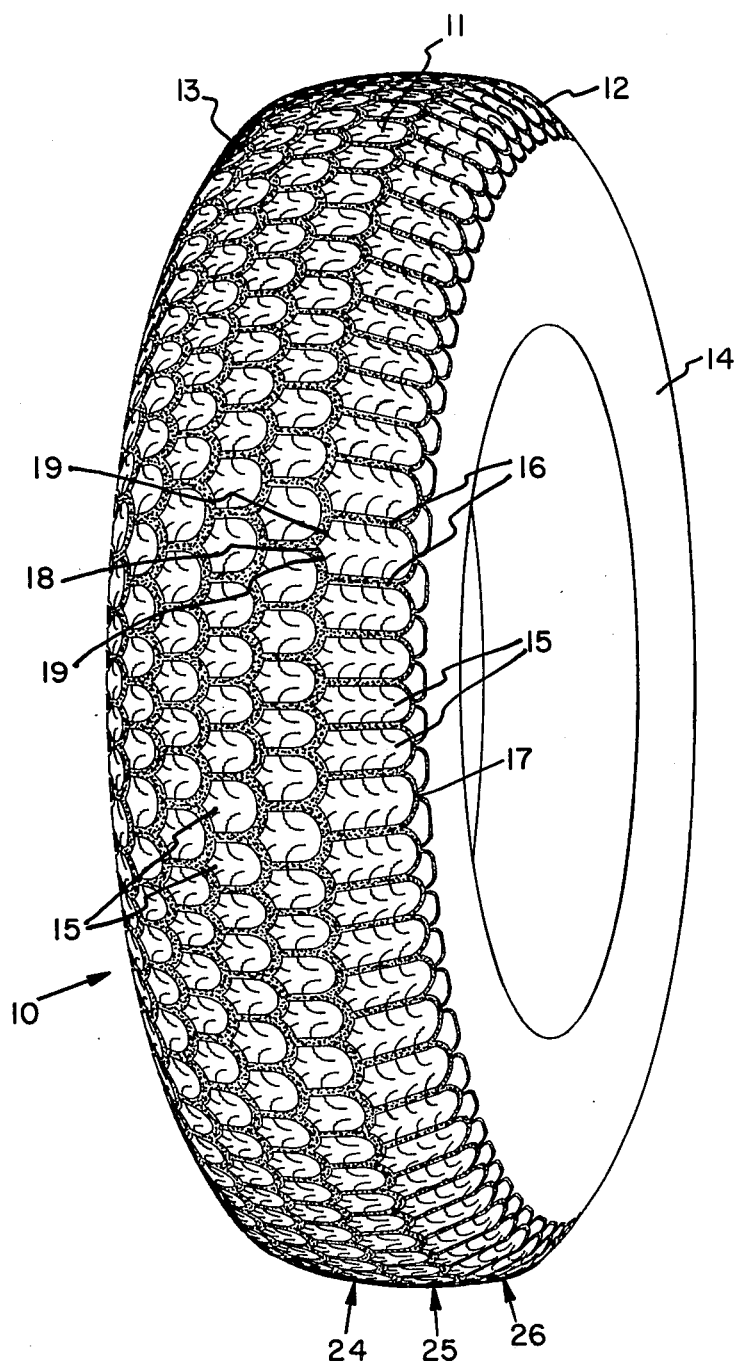
FIG. 1 is a perspective view of a tire according to this invention.
Figure 2:
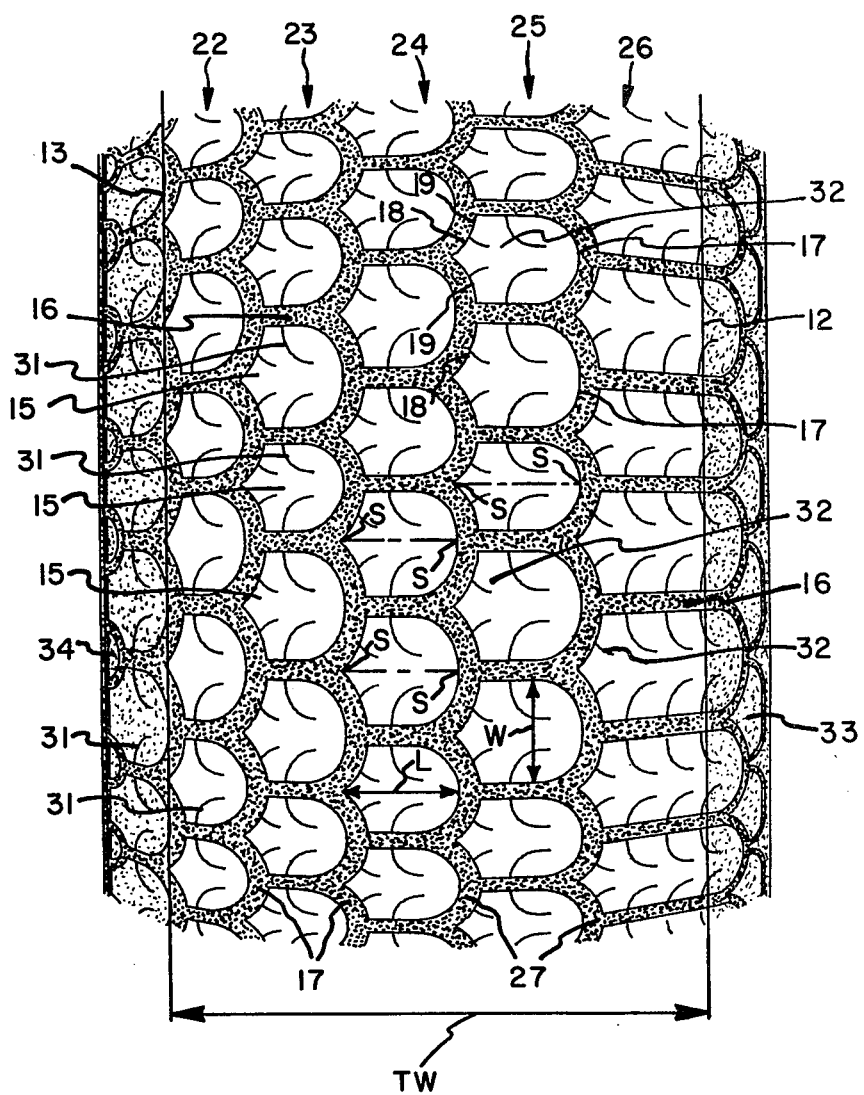
FIG. 2 is a fragmentary enlarged plan view of the tire shown in FIG. 1.

With reference to FIGS. 1 and 2, there is illustrated an automobile radial pneumatic tire 10 having a ground engaging tread portion 11. The tread portion 11 has a pair of lateral edges 12, and 13. The tread portion is joined at its lateral edges 12 and 13 to a pair of sidewalls 14 that extend radially inwards from the tread portion each terminating in a bead portion.

The tread portion 11 consists of a plurality of independent blocks 15 arranged around the circumference of the tire. Each block 15 is directional in that it only has a single plane of symmetry S-S which is directed substantially axially across the tire, that is axially with respect to the axis of rotation of the tire on a vehicle axle. The term substantially axial is meant to embrace blocks oriented up to 15° (fifteen degrees) on either side of said axis.

The blocks 15 are arranged in five circumferential rows 22, 23, 24, 25, 26, around the tire. The blocks in each row are separated from each other by substantially axial grooves 16 and adjacent rows are circumferentially staggered relative to each other so that the axial grooves 16 do not form a straight pathway across the tread portion.

The blocks 15 each have a peripheral surface which has an outer face 17 thereon which is directed towards the outer edge 12 of the tread portion 11, and an inner face 18 that is directed towards the inner edge of the tread portion. The outer face 17 of each block has a generally convex configuration which is substantially circular when viewed in a plan view as in FIG. 2 i.e. the face 17 can vary from exactly semi-circular to a circumferentially elongated semi-circle, that is circumferentially with respect to the tire. The inner faces 18 of the blocks are also similar to each other and when viewed in plan, each has two concave edges 19 generally in the form of arcs or quadrants.

The circumferential width W of the blocks varies between 10%-20% of the tread width TW of the tire and the axial length L of the blocks varies between 10%-35% of the tread width TW. For the purposes of this invention tread width TW is defined as the axial distance across the tire as measured from the footprint of the tire when inflated to a design pressure and at a rated load.

As can be seen in FIG. 2 the axial length L of the blocks 15 in each row 22, 23, 24, 25, or 26, increases progressively from about 10% of tread width TW in the innermost row 22 to about 35% of tread width TW at the outermost row 26. This results in a progressive variation in tread stiffness in the axial direction across the tread. The circumferential widths W of the blocks are varied in pitch ratios as is practiced in the industry so as to help reduce tire noise.

The circumferential rows 22-25 of blocks 15 are arranged so that the semi-circular outer face 17 of each block is circumferentially adjacent with the space formed by the concave edges 19 on the inner faces of two adjacent blocks of the neighboring outer row. For example the outer faces 17 of blocks 15 in row 22 are adjacent concave edges 19 of blocks 15 in row 23. The foregoing arrangement forms a substantially scalloped configuration extending groove 27 between adjacent rows of blocks.

Each block 15 has a pair of slits 31 (sometimes known as blades or sipes) which extend into the respective block one from each of the straight grooves 16 on each side of the block. The slits 31 curve around in an arc and extend towards the outer edge 12, such that the slits curve towards the centre portion of the semi-circular outer face 17 of the block.

The axially longer blocks 15 in row 26 have three pairs of slits 31 extending from their respective straight grooves 16 into each block. Also the blocks 15 in rows 23, 24, 25, and 26 each have additional slits 32 which extend into the block from its concave edges 19 and also extend in direction of the outer edge 12 and towards the central portion of the outer face 17 of each respective block.

Thus all the slits 31 and 32 in the tread portion will extend towards the same edge of the tread, in this case the outer edge 12.

In the areas axially outside the tread portion there may be provided additional inter block decorations 21, 33 and 34 as illustrated.

Figure 3:
FIG. 3 and FIG. 4 show alternate block configurations which are also in accordance with the present invention.
Figure 4:

FIG. 3 and FIG. 4 show alternative types of convex shape for the outer face of the block 15 in which the outer face is formed from a multi-faceted or quasi polygonal configuration. The convex outer faces 17 of the blocks 15 give the tread blocks a high lateral stability. This stability is further enhanced by the presence of the curved slits 31 in each block. These slits have circumferentially and axially directed portions that contribute both to the traction properties of the tire and to its lateral stability.

Whilst the invention has been described with reference to the accompanying drawings it is envisaged that the outermost row 26 of blocks could be joined together to form a continuous rib.

Whilst certain representative embodiments and details have been shown for the purposes of illustrating the invention, it will be apparent to those skilled in the art that various changes and modifications may be made therein without departing from the scope of the invention, for example there could be four or five rows of blocks instead of six.

I claim:

1. A pneumatic tire having a tread portion with a pair of lateral edges, the tread portion consisting of a plurality of independent blocks each having a single plane of symmetry which is directed substantially axially across the tread portion, the blocks each having a respective face thereon directed towards a given one of said edges, all of the respective faces having a generally convex configuration.

2. A tire as claimed in claim 1 wherein the blocks are arranged in circumferential rows around the tire, and adjacent blocks in each row are separated from each other by substantially axial straight grooves.

3. A tire as claimed in claim 2 wherein the blocks in adjacent circumferential rows are staggered relative to each other.

4. A tire as claimed in claim 1 wherein the blocks are arranged in circumferential rows around the tire and the axial length of the blocks in each row increases progressively from row to row across the tire.

5. A tire as claimed in claim 4 wherein one of said edges is an inner edge, and the other of said edges is an outer edge, and the blocks increase in axial length from being shortest at the inner edge to being longest at the outer edge.

6. A tire as claimed in claim 1 wherein said respective faces are directed towards the outer lateral edge.

7. A tire as claimed in claim 1 wherein each of said faces is substantially semi-circular.

8. A tire as claimed in claim 7 wherein the blocks are arranged in circumferential rows and each block has an inner face directed towards the inner edge, and each inner face has two symmetrically arranged concave edges, and adjacent rows of blocks are arranged so that the semi-circular outer faces of the blocks in one row are aligned with the space formed by concave edges on the inner faces of two adjacent blocks in the neighbouring outer row.

9. A tire as claimed in claim 1 wherein each block has at least one slit extending into the block from the periphery thereof, and all the slits so formed in the tread portion extend towards a given lateral edge.

10. A tire as claimed in claim 9, one of said edges is an outer edge and all the slits extend towards the outer edge.

11. A tire as claimed in claim 2, wherein each of the blocks has at least one pair of slits, each said slits extending into the block from a respective straight groove at the side of the block, and all the slits curve in the direction of a given lateral edge.

12. A tire as claimed in claim 11, wherein one of said lateral edges is an outer lateral edge and all the slits in all the blocks curve in the direction of the outer edge.

13. A tire as claimed in claim 12, wherein each block is formed so that its respective face thereon directed towards the given edge has a substantially semi-circular configuration, the given edge being the outer edge, and the slits arcs towards the centre portion of the semi-circular face.

* * * * *

UNITED STATES PATENT AND TRADEMARK OFFICE
CERTIFICATE OF CORRECTION

PATENT NO. : 4,479,525
DATED : October 30, 1984
INVENTOR(S) : Maurice Graas

It is certified that error appears in the above-identified patent and that said Letters Patent are hereby corrected as shown below:

On the cover page under the listing of "References Cited" [56]

add to the list of "U.S. PATENT DOCUMENTS"

-- 3,217,776    11/1965 Ellenrieder et al    152/209R -- add to the list of "OTHER PUBLICATIONS"

-- 2,814,945    10/1978 Fed. Rep. of Germany    152/209D --

Signed and Sealed this

Thirtieth Day of April 1985

[SEAL]

Attest:

DONALD J. QUIGG

*Attesting Officer*    *Acting Commissioner of Patents and Trademarks*